US011078948B2

(12) United States Patent
Yepes Gallo et al.

(10) Patent No.: US 11,078,948 B2
(45) Date of Patent: Aug. 3, 2021

(54) FASTENER BOSS AND MOTOR VEHICLE COMPONENT INCORPORATING THAT FASTENER BOSS

(71) Applicant: FORD GLOBAL TECHNOLOGIES, LLC, Dearborn, MI (US)

(72) Inventors: Santiago Yepes Gallo, Mexico City (MX); Bhavani S. Thota, Novi, MI (US); Linh Ngoc Doan, Belleville, MI (US); Ryan Mowery, Albion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 250 days.

(21) Appl. No.: 16/278,516

(22) Filed: Feb. 18, 2019

(65) Prior Publication Data
US 2020/0263724 A1  Aug. 20, 2020

(51) Int. Cl.
*F16B 37/00* (2006.01)
*F16B 5/02* (2006.01)
*B60R 13/02* (2006.01)

(52) U.S. Cl.
CPC ........ *F16B 37/005* (2013.01); *B60R 13/0206* (2013.01); *F16B 5/02* (2013.01)

(58) Field of Classification Search
USPC ...................................................... 411/427
See application file for complete search history.

(56) References Cited

U.S. PATENT DOCUMENTS

| 4,387,738 | A | * | 6/1983 | Bisonaya | E03C 1/0404 137/801 |
| 5,038,460 | A | * | 8/1991 | Ide | H02K 15/14 29/596 |
| 5,169,116 | A | * | 12/1992 | Bergetz | F16M 11/22 248/205.3 |
| 5,356,590 | A | * | 10/1994 | Melanson | B29C 45/44 264/328.1 |
| 5,401,459 | A | * | 3/1995 | Nichols | B29C 45/1704 264/328.12 |
| 5,492,388 | A | * | 2/1996 | Kawasaki | B62D 25/147 296/193.02 |
| 6,089,523 | A | * | 7/2000 | Brow | B60R 1/06 248/475.1 |

(Continued)

FOREIGN PATENT DOCUMENTS

| DE | 102006016032 A1 | 10/2007 |
| DE | 202014103640 U1 | 8/2014 |

(Continued)

OTHER PUBLICATIONS

English Machine Translation of DE102006016032A1 dated Oct. 18, 2007.

(Continued)

*Primary Examiner* — Gary W Estremsky
(74) *Attorney, Agent, or Firm* — David Coppiellie; King & Schickli, PLLC (57) ABSTRACT

A fastener boss includes a body having a receiving column. The receiving column includes a first section with a first wall thickness and a second section with a second wall thickness wherein the first wall thickness is greater than the second wall thickness. A motor vehicle component incorporating the fastener boss is also disclosed.

16 Claims, 6 Drawing Sheets

(56) References Cited

U.S. PATENT DOCUMENTS

| | | | |
|---|---|---|---|
| 6,409,249 B1* | 6/2002 | Han | B60N 3/026 296/1.02 |
| 7,849,559 B2* | 12/2010 | Lindmark | B60R 21/34 16/86 A |
| 8,128,139 B2 | 3/2012 | Stoffel et al. | |
| 8,337,973 B2* | 12/2012 | Ishii | B29C 45/0025 428/119 |
| 10,006,481 B2 | 6/2018 | Tomatsu | |
| 2012/0128957 A1* | 5/2012 | Arai | B29C 44/0415 428/218 |
| 2013/0330149 A1 | 12/2013 | Chen et al. | |
| 2014/0215769 A1* | 8/2014 | Lee | B60R 13/0206 24/289 |
| 2014/0346799 A1* | 11/2014 | Balla | B60R 13/0206 296/1.08 |
| 2017/0218987 A1* | 8/2017 | Proctor | F16B 5/025 |
| 2018/0304544 A1* | 10/2018 | Ii | B29C 66/73921 |

FOREIGN PATENT DOCUMENTS

| | | |
|---|---|---|
| DE | 102016215414 A1 | 2/2018 |
| DE | 102017104384 A1 | 9/2018 |
| JP | 2008002575 A | 1/2008 |
| JP | 2017193106 A | 10/2017 |
| KR | 101857489 B1 | 5/2018 |

OTHER PUBLICATIONS

English Machine Translation of DE102016215414A1 dated Feb. 22, 2018.
English Machine Translation of DE102017104384A1 dated Sep. 6, 2018.
English Machine Translation of DE202014103640U1 dated Aug. 21, 2014.
English Machine Translation of JP2008002575A dated Jan. 10, 2008.
English Machine Translation of JP2017193106A dated Oct. 26, 2017.
English Machine Translation of KR101857489B1 dated May 14, 2018.

* cited by examiner

FASTENER BOSS AND MOTOR VEHICLE COMPONENT INCORPORATING THAT FASTENER BOSS

TECHNICAL FIELD

This document relates generally to the motor vehicle equipment field and, more particularly to a new and improved fastener boss as well as to a motor vehicle component incorporating that fastener boss.

BACKGROUND

The most common approach utilized to attach a serviceable door trim plastic component to a door inner relies upon screw fasteners. The receiving column of a screw boss molded into a trim panel component must be of a certain minimum strength in order to provide proper connections through the screw fastener. That strength is largely determined by the geometry of the screw boss.

Unfortunately geometric considerations required to satisfy screw boss requirements often result in an injection defect known as sink. Sink is caused by the difference of cooling rates between the main geometry of the trim component and the attaching feature or screw boss causing small cavities or depressions in the surface visible to the customer (A surface).

In order to maintain the necessary geometry for proper connection of the trim panel through the screw fastener and to correct for sink, it is known to provide the screw boss on a doghouse. A doghouse is a mounting strategy in which the screw boss is detached from the main geometry or B-surface of the trim panel and attached to a secondary geometry, the doghouse, that can meet the necessary rib-to-wall ratio that prevents or limits sink.

In order to create a doghouse, lifters must be used to mold the die locked geometry. This adds cost and complexity to the packaging feasibility as lifters require extra components and space to move. The deeper the action, the further the lifter will have to move to clear any surrounding features. This can limit design freedoms as component attachment via heat stakes becomes complicated as any heat stake must be moved further away from the screw boss than might otherwise be required in order to clear the area for lifter travel.

This document relates to a new and improved fastener boss that eliminates the need for doghouses, substantially reduces lifter travel and maximizes packaging space.

SUMMARY

In accordance with the purposes and benefits described herein, a new and improved fastener boss is provided. That fastener boss comprises a body including a receiving column having a first section, with a first wall thickness $T_1$, and a second section, with a second wall thickness $T_2$, where $T_1 > T_2$. The first section may extend along a first arc $A_1$ and the second section may extend along a second arc $A_2$ wherein $A_1 > A_2$. In at least some of the many possible embodiments of the fastener boss, the first arc $A_1$ is at least 250 degrees.

The receiving column may include an opening at a first end and an undercut in the first section at a second end. The body of the fastener boss may further include a plurality of ribs extending from the receiving column. The first rib may extend from a first section at an intermediate position along the first arc. The second rib may extend from the first section at a first end of the first arc where the first section meets the second section. The third rib may extend from the first section at a second end of the first arc where the first section meets the second section. The fourth rib may extend from the second section at an intermediate point along the second arc.

The second rib and the third rib may be L-shaped in profile. Further, the first rib may be opposite the fourth rib.

In accordance with an additional aspect, a new and improved motor vehicle component is provided. That motor vehicle component comprises a first surface, a second surface and a fastener boss carried on the second surface. That fastener boss includes a body including a receiving column having a first section, with a first wall thickness $T_1$, and a second section, with the second wall thickness $T_2$, where $T_1 > T_2$.

The fastener boss of the motor vehicle component may further include any and all additional features of the fastener boss described elsewhere in this document.

In the following description, there are shown and described several preferred embodiments of the fastener boss and the motor vehicle component incorporating that fastener boss. As it should be realized, the fastener boss and the motor vehicle component are capable of other, different embodiments and their several details are capable of modification in various, obvious aspects all without departing from the fastener boss and motor vehicle component as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the fastener boss and the motor vehicle component and together with the description serve to explain certain principles thereof.

Reference will now be made in detail to the present preferred embodiments of the fastener boss and motor vehicle component, examples of which are illustrated in the accompanying drawing figures.

DETAILED DESCRIPTION

Reference is now made to FIGS. 1A-1C and 2 illustrating the new and improved motor vehicle component 10. The motor vehicle component 10 may comprise, for example, a molded trim panel such as may be connected to the super structure of a motor vehicle such as a door inner. The motor vehicle component 10 includes a first surface or A-surface 12 and a second surface or B-surface 14. As is known in the art, the A-surface 12 is the surface that is oriented toward and visible to the motor vehicle user when the motor vehicle component 10 is assembled into the motor vehicle. In the illustrated embodiment, the first surface or A-surface 12 is opposite the second surface or B-surface 14 and thus is hidden from view.

A new and improved fastener boss 16 is carried on the second surface 14. The fastener boss 16 has a body 18 that includes a receiving column 20 having a central bore 22 configured to receive and hold a fastener such as a screw (not shown).

In the illustrated embodiment of the fastener boss 16, the receiving column 20 has a first section 24, with a first wall thickness $T_1$, and a second section 26, with a second wall thickness $T_2$, where $T_1 > T_2$. In some of the many possible useful embodiments of the fastener boss 16, the first section 24 has a first wall thickness of between 1.7 and 2.5 mm while the second section 26 has a second wall thickness of between 1.0 and 1.2 mm for a M3 size screw application.

As further illustrated in the drawing figures, the first section 24 extends along a first arc $A_1$ and the second section 26 extends along a second arc $A_2$ wherein $A_1 + A_2 = 360$ degrees and $A_1 > A_2$. In one or more of the many possible embodiments of the fastener boss 16, the first arc $A_1$ is at least 250 degrees. In other possible embodiments, the first arc $A_1$ is at least 260 degrees. In still other possible embodiments the first arc $A_1$ is at least 270 degrees. In still other possible embodiments, the first arc $A_1$ is at least 280 degrees. In still other possible embodiments, the first arc $A_1$ is at least 290 degrees. In still other possible embodiments the first arc $A_1$ is at least 300 degrees.

The receiving column 20 further includes a central bore opening 28 at a first end 30 and an undercut 32 in the first section 24 at a second end 34. The undercut 32 forms a neck 36 of smaller circumference, thickness and mass at the point where the first section 24 interfaces with the second surface 14. This reduces the tendency of the fastener boss 16 to cause any sink marks in the first surface 12.

The fastener boss 16 also includes a plurality of ribs 38, 40, 42, 44 extending from the receiving column 20. More particularly, the first rib 38 extends from the first section 24 at an intermediate position along the first arc $A_1$. The second rib 40 extends from the first section 24 at a first end of the first arc $A_1$ where the first section meets the second section 26. The third rib 42 extends from the first section 24 at a second end of the first arc $A_1$ where the first section meets the second section 26. The fourth rib 44 extends from the second section 26 at an intermediate point along the second arc $A_2$.

Figure 1A:
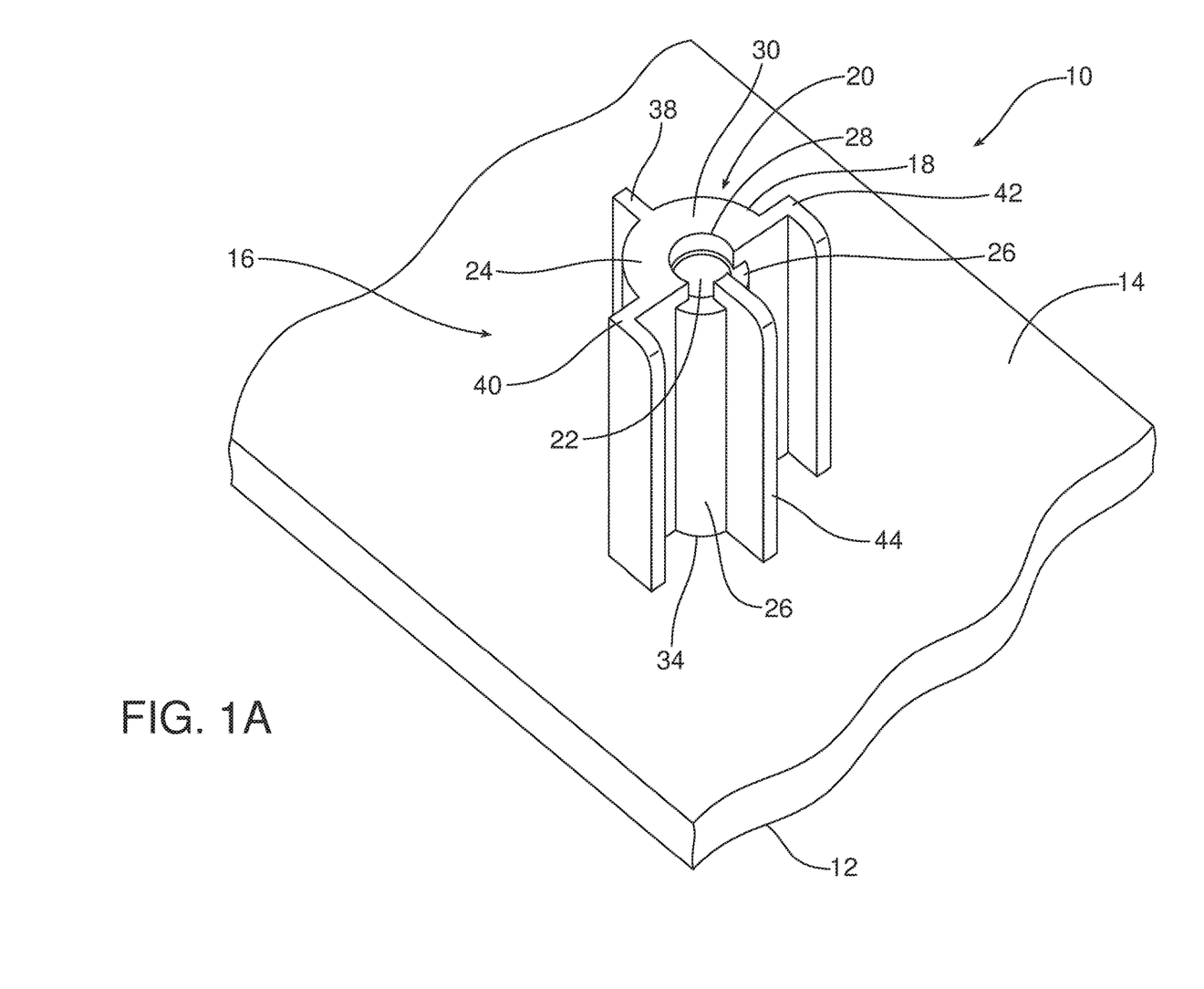
FIGS. 1A-1C are various detailed perspective views of a new and improved motor vehicle component incorporating the new and improved fastener boss particularly adapted to provide screw fastener connection of high integrity and elimination of sink marks in the A surface of the motor vehicle component.
Figure 1B:
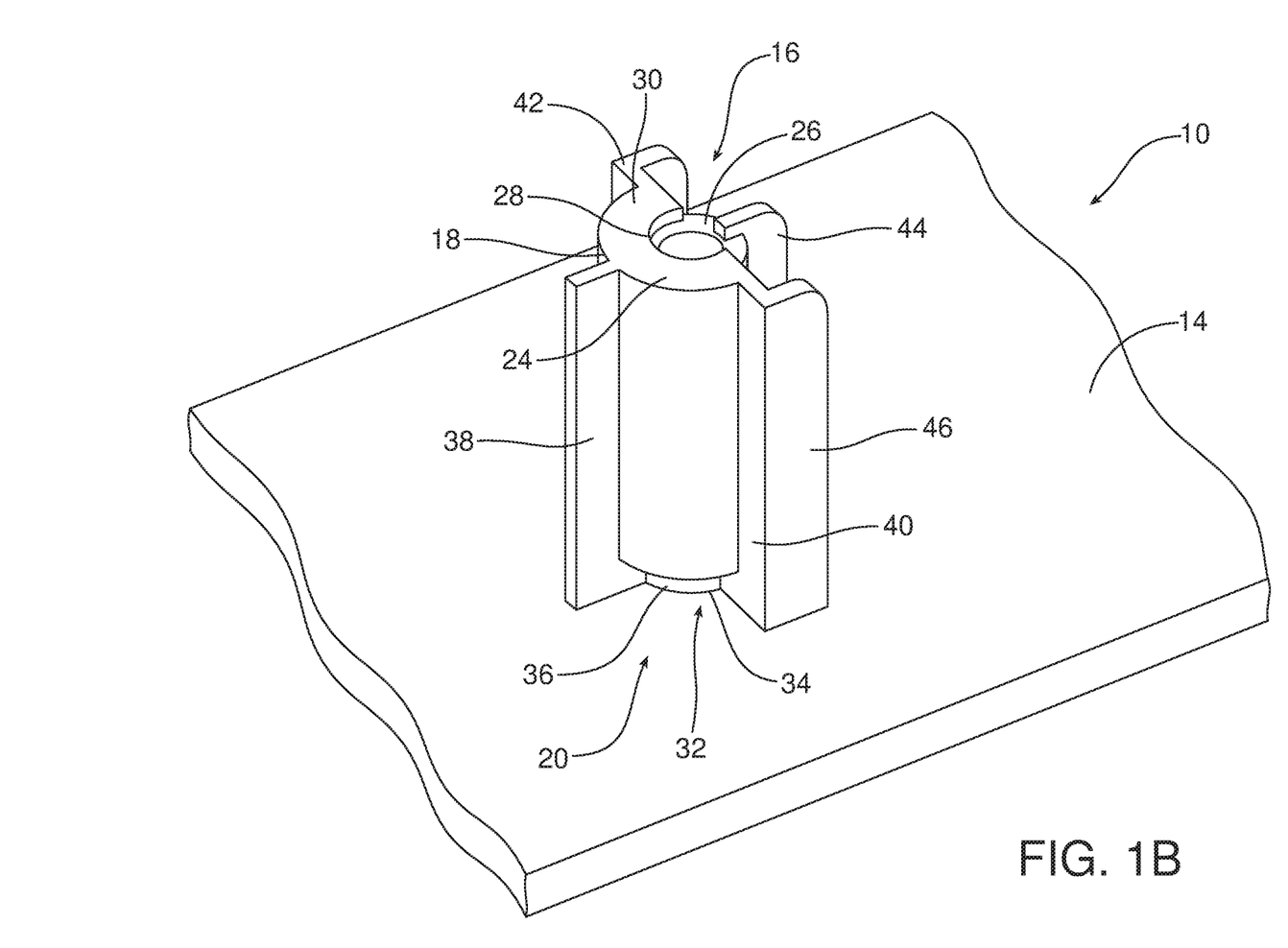
Figure 1C:
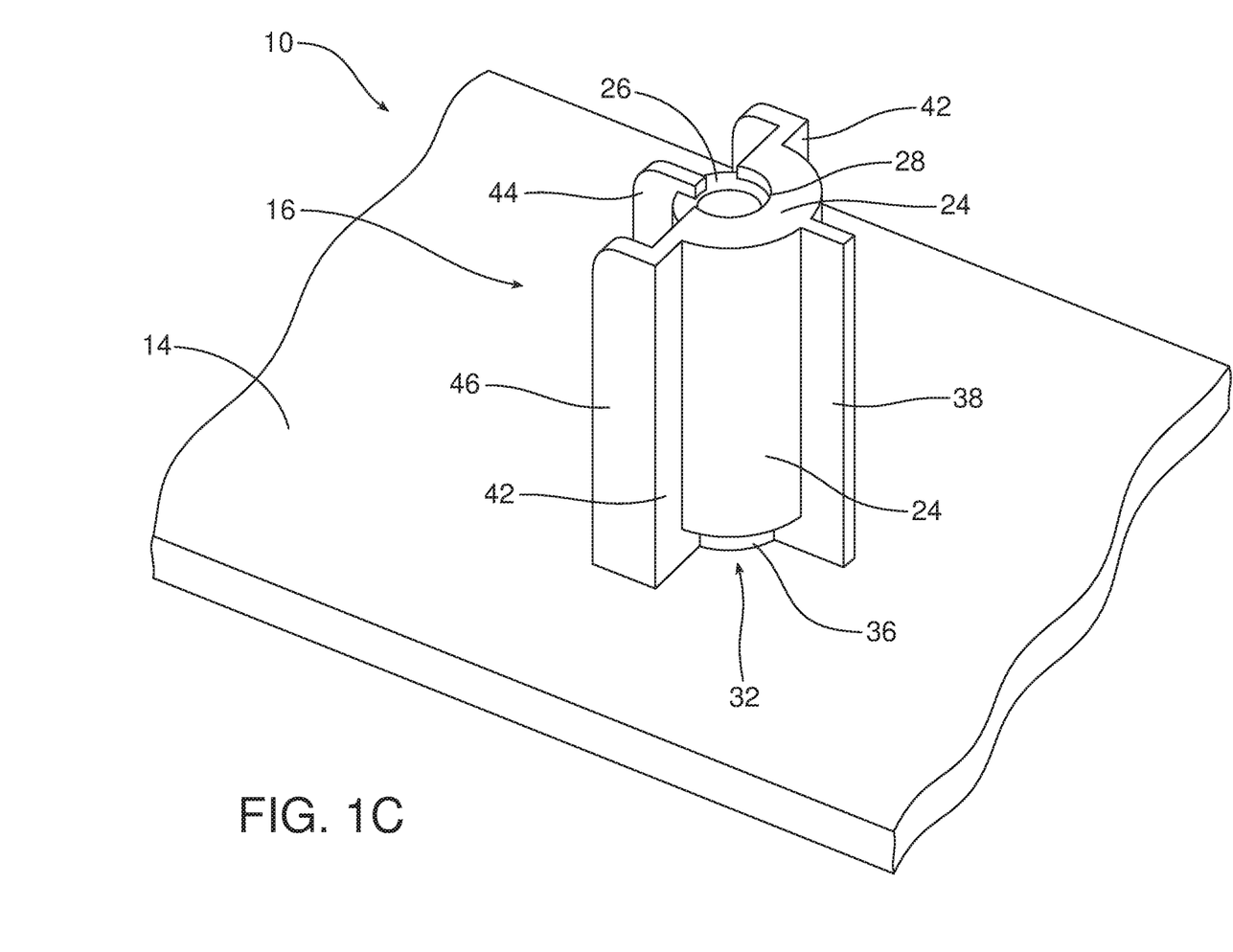
Figure 2:
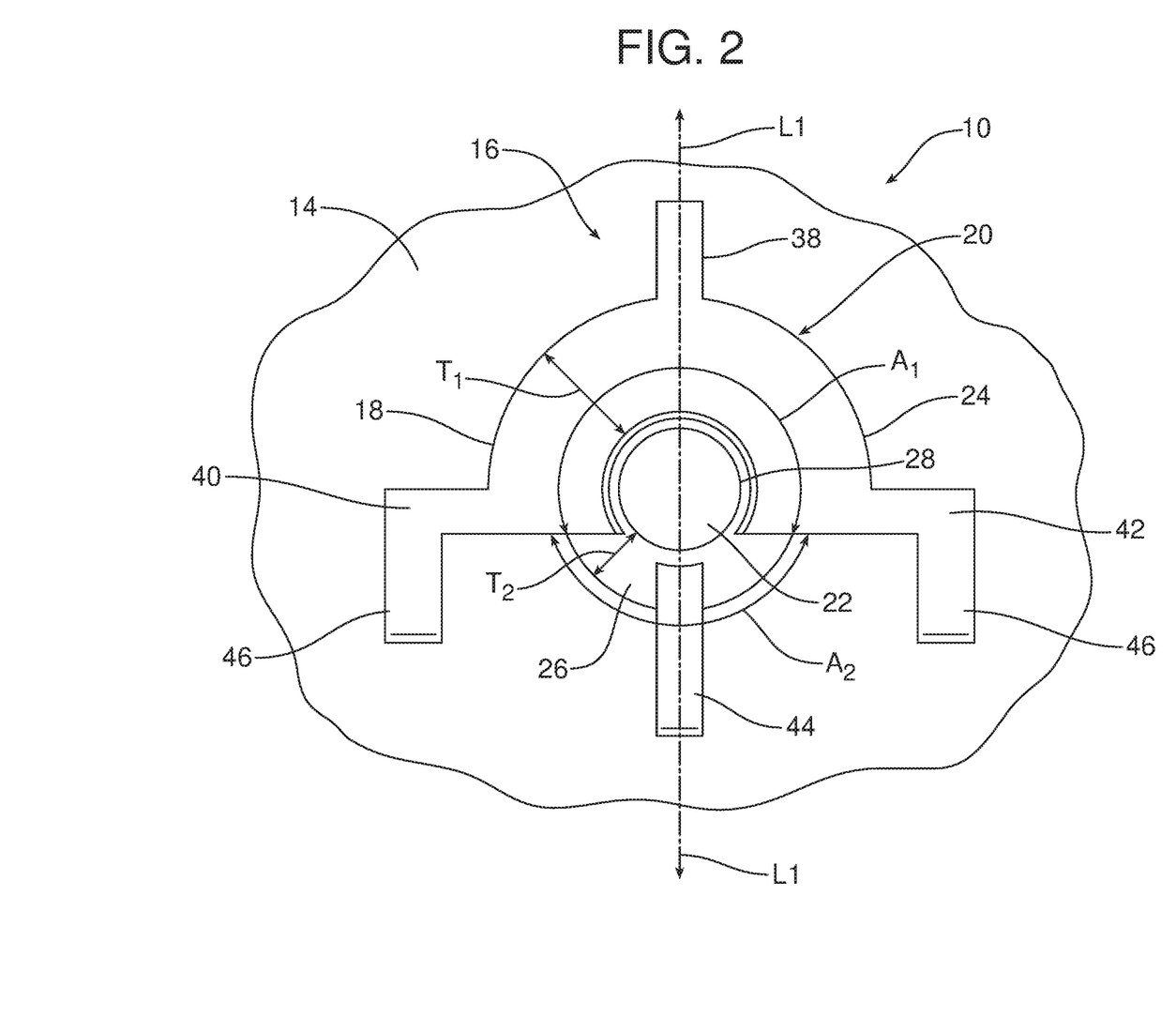
FIG. 2 is a detailed top plan view of the motor vehicle component and fastener boss illustrated in FIGS. 1A-1C.
Figure 3A:
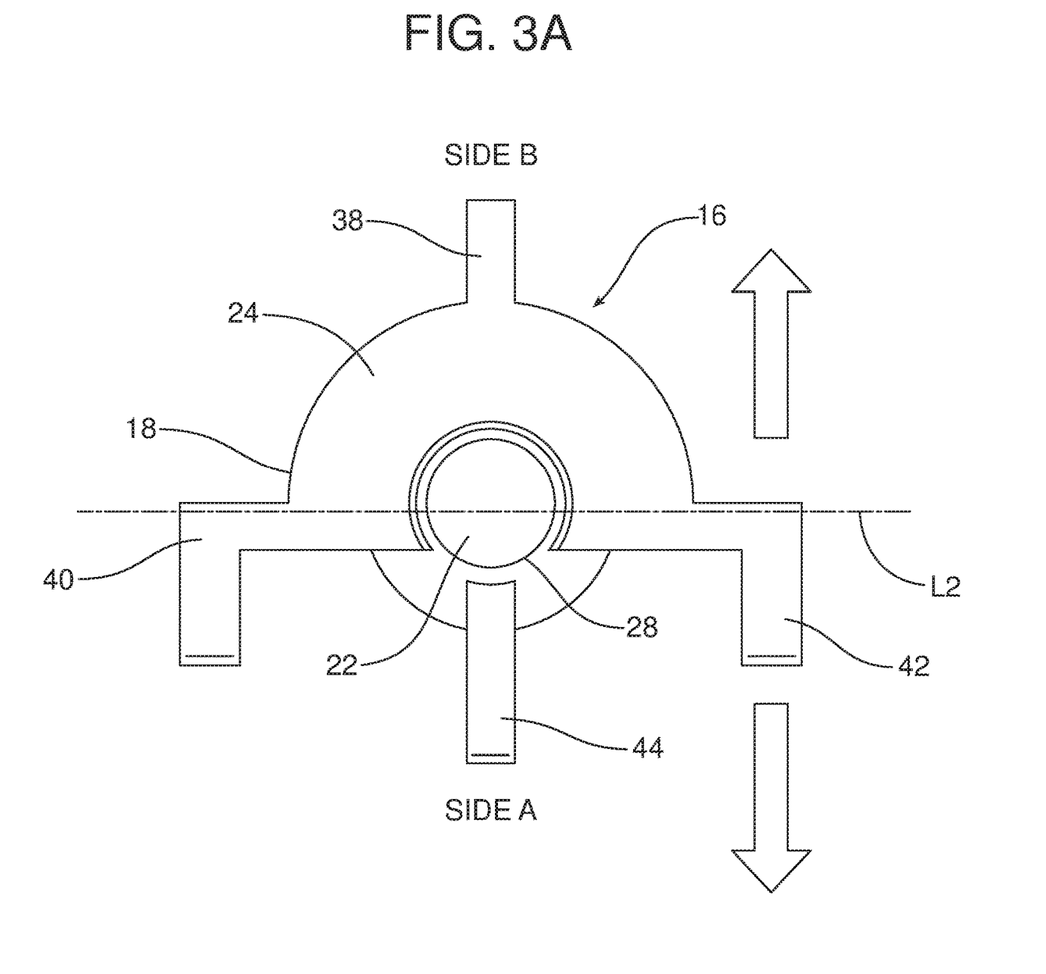
FIGS. 3A and 3B are respective schematic top plan and side elevational views illustrating how simplified tooling may be utilized to form the fastener boss.
Figure 3B:
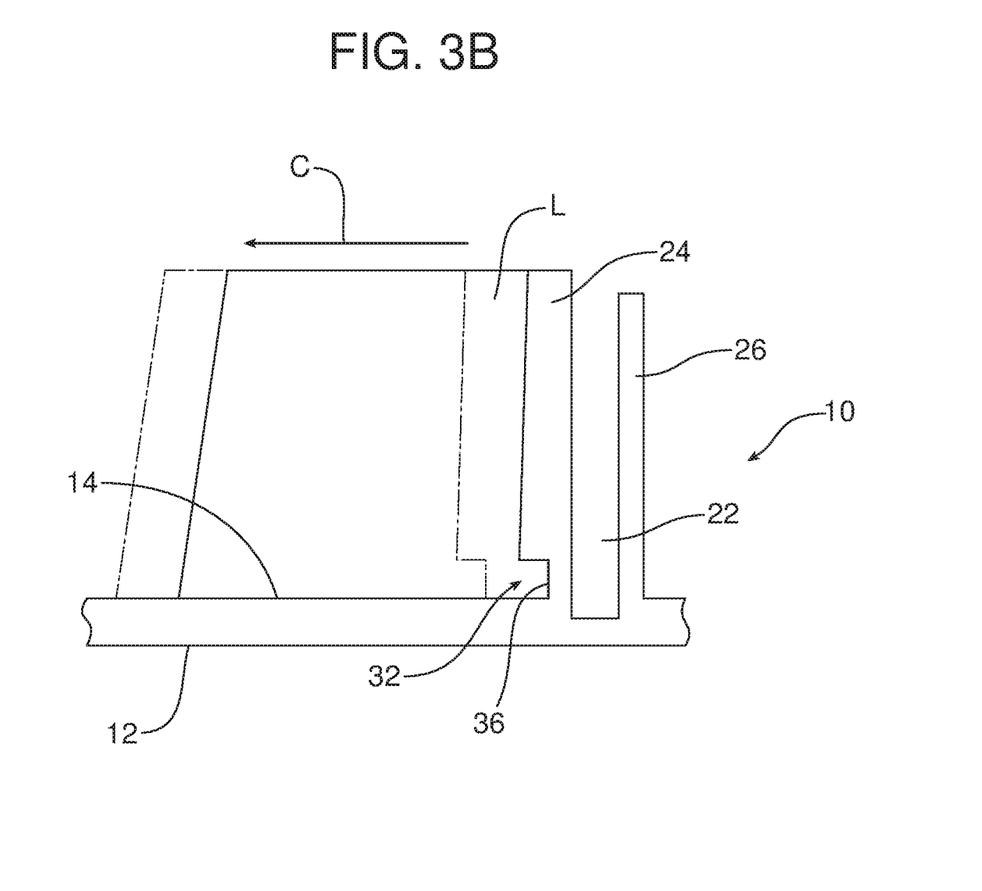

In the illustrated embodiment, the second rib 40 and the third rib 42 are both L-shaped in profile. In addition, the first rib 38 and the fourth rib 44 are opposite one another. As should be appreciated, the distal legs 46 of the L-shaped second and third ribs 40, 42 are oriented or directed away from the first rib 38. Further, the distal legs 46 of the second and third ribs 40, 42 extend parallel to a line L1 passing through the first and fourth ribs 38, 44. As should be appreciated from reviewing FIGS. 3A and 3B, the fastener boss 16, when provided as an integral component of the motor vehicle component 10, may be formed by a core cavity on side A of the line L2 and a lifter on side B of the line L2. As should be appreciated from reviewing FIG. 3B, the lifter L need only be displaced a slight distance in the direction of action arrow C from the molding position used to form the undercut 32 and neck 36 (which is illustrated in full line in FIG. 3B) to the mold opening position (which is illustrated in phantom line in FIG. 3B).

In summary, numerous benefits and advantages are provided by the new and improved fastener boss 16. By providing a receiving column 20 with a reduced cross section neck 36 under the relatively thick first section 24 at the point of connection with the second surface 14 of the motor vehicle component 10 and a second section 26 of reduced cross section or thickness the rib-to-wall ratio is reduced and sink avoidance is achieved. The first rib 38 splits the undercut 32 into two portions thereby reinforcing the first section 24. In a similar manner, the fourth rib reinforces the thinner second section 26. The L-shaped second and third ribs 40, 42 are oriented so that the distal legs 46 are directed toward the second section 26 and function with the first and second ribs to distribute torque and axial loads as necessary and allow a secure connection between the motor vehicle component and a supporting substrate by means of the screw fastener received and tightened in the fastener boss 16.

While the fastener boss 16 allows for the necessary toque, load and stress distribution, it should also be appreciated that boss height may also be reduced and packaging space may be optimized by securing the boss directly to the second surface 14 of the motor vehicle component 10 instead of through an intermediate doghouse. The fastener boss 16 disclosed herein typically requires an average of 6 mm in height to be properly packaged. This is a significant benefit in an environment where tolerances to sheet metal are as little as 6 mm.

The foregoing has been presented for purposes of illustration and description. It is not intended to be exhaustive or to limit the embodiments to the precise form disclosed. Obvious modifications and variations are possible in light of the above teachings. For example, a neck 36 is only provided at the base of the first section 24 of the receiving column 20 in the illustrated embodiment. It should be appreciated that a neck may be provided around the full 360 degrees of the base of the reinforcing column 20 if two opposed lifters are utilized to form the fastener boss 16. All such modifications and variations are within the scope of the appended claims when interpreted in accordance with the breadth to which they are fairly, legally and equitably entitled.

What is claimed:

1. A fastener boss, comprising:
a body including a receiving column having a first section, with a first wall thickness $T_1$, and a second section, with a second wall thickness $T_2$, where $T_1 > T_2$ and wherein said first section extends along a first arc $A_1$ and said second section extends along a second arc $A_2$ wherein $A_1 > A_2$ and $A_1 + A_2 = 360°$.

2. The fastener boss of claim 1, wherein said first arc $A_1$ is at least 250 degrees.

3. The fastener boss of claim 1, wherein said body further includes a plurality of ribs extending from said receiving column.

4. The fastener boss of claim 3, wherein a first rib of said plurality of ribs extends from said first section at an intermediate position along said first arc $A_1$.

5. The fastener boss of claim 4, wherein a second rib of said plurality of ribs extends from said first section at a first end of said first arc $A_1$ where said first section meets said second section.

6. The fastener boss of claim 5, wherein a third rib of said plurality of ribs extends from said first section at a second end of said first arc $A_1$ where said first section meets said second section.

7. The fastener boss of claim 6, wherein a fourth rib of said plurality of ribs extends from said second section at an intermediate point along said second arc $A_2$.

8. The fastener boss of claim 7, wherein said second rib and said third rib are L-shaped in profile.

9. The fastener boss of claim 8, wherein said first rib is opposite said fourth rib.

10. A fastener boss, comprising:
a body including a receiving column having a first section, with a first wall thickness $T_1$, and a second section, with a second wall thickness $T_2$, where $T_1 > T_2$ wherein (a) said receiving column includes an opening at a first end and an undercut in said first section at a second end, (b) said body further includes a plurality of ribs extending from said receiving column and (c) a first rib of said plurality of ribs extends from the first section at an intermediate position along a first arc A, of said first section.

11. The fastener boss of claim 10, wherein a second rib of said plurality of ribs extends from said first section at a first end of said first arc $A_1$ where said first section meets said second section.

12. The fastener boss of claim 11, wherein a third rib of said plurality of ribs extends from said first section at a second end of said first arc $A_1$ where said first section meets said second section.

13. The fastener boss of claim 12, wherein a fourth rib of said plurality of ribs extends from said second section at an intermediate point along said second arc $A_2$.

14. The fastener boss of claim 13, wherein said second rib and said third rib are L-shaped in profile.

15. The fastener boss of claim 14, wherein said first rib is opposite said fourth rib.

16. A fastener boss, comprising:
a body including a receiving column having a first section, with a first wall thickness $T_1$, and a second section, with a second wall thickness $T_2$, where $T_1 > T_2$ wherein (a) said first section extends along a first arc $A_1$ and said second section extends along a second arc $A_2$ wherein $A_1 > A_2$, (b) said first arc $A_1$ is at least 250 degrees and (c) said receiving column includes a central bore opening at a first end of said receiving column and an undercut in said first section at a second end of said receiving column.

* * * * *